(12) United States Patent
Bankstahl

(10) Patent No.: US 6,232,576 B1
(45) Date of Patent: May 15, 2001

(54) MOVEABLE LIFTING EYE MECHANISM

(75) Inventor: Herbert A. Bankstahl, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/209,511

(22) Filed: Dec. 10, 1998

(51) Int. Cl.$^7$ .................................................. B23K 9/00
(52) U.S. Cl. .............................. 219/133; 16/429; 294/1.1
(58) Field of Search ............................ 294/1.1, 15, 67.1, 294/67.4, 68.1, 68.3, 82.1, 90, 167, 168; 16/405, 429; 190/39, 115; 220/752, 757, 761, 763, 770; 229/117.22, 117.24; 312/244; 219/133

(56) References Cited

U.S. PATENT DOCUMENTS

| | | | |
|---|---|---|---|
| D. 142,783 | * 11/1945 | Jacobson | 220/761 X |
| 1,268,124 | * 6/1918 | Jennings | 220/761 |
| 2,025,149 | * 12/1935 | Barkhausen et al. | 16/429 |
| 2,453,835 | * 11/1948 | Donkin | 16/429 X |
| 5,317,795 | * 6/1994 | Bolton et al. | 312/244 X |

OTHER PUBLICATIONS

Owner's Manual—By Miller Electric—Big Blue 400D—Form OM–463V—Jul. 1995.

* cited by examiner

Primary Examiner—Johnny D. Cherry
(74) Attorney, Agent, or Firm—Donald Cayen

(57) ABSTRACT

A lifting eye is selectively slidable to an extended position whereat it is easily accessible above the top cover of a welding machine for purposes of lifting the machine. The lifting eye is further slidable to a retracted position whereat it is almost completely below the top cover, but an opening remains for inserting a finger. The lifting eye has a bar that slides between straight portions of a strap that is secured to the welding machine. A spring straddles the strap and has V-sections that protrude through slots in the strap and lie in the path of the lifting eye bar. The spring V-sections retain the lifting eye in the extended position against unintentional sliding. When it is desired to slide the lifting eye, the lifting eye bar contacts the spring V-sections and deflects the spring legs to enable the lifting eye bar to slide between the V-sections. In an alternate embodiment, resilient plates produce friction on the lifting eye that resists sliding thereof between the extended and retracted positions.

10 Claims, 3 Drawing Sheets

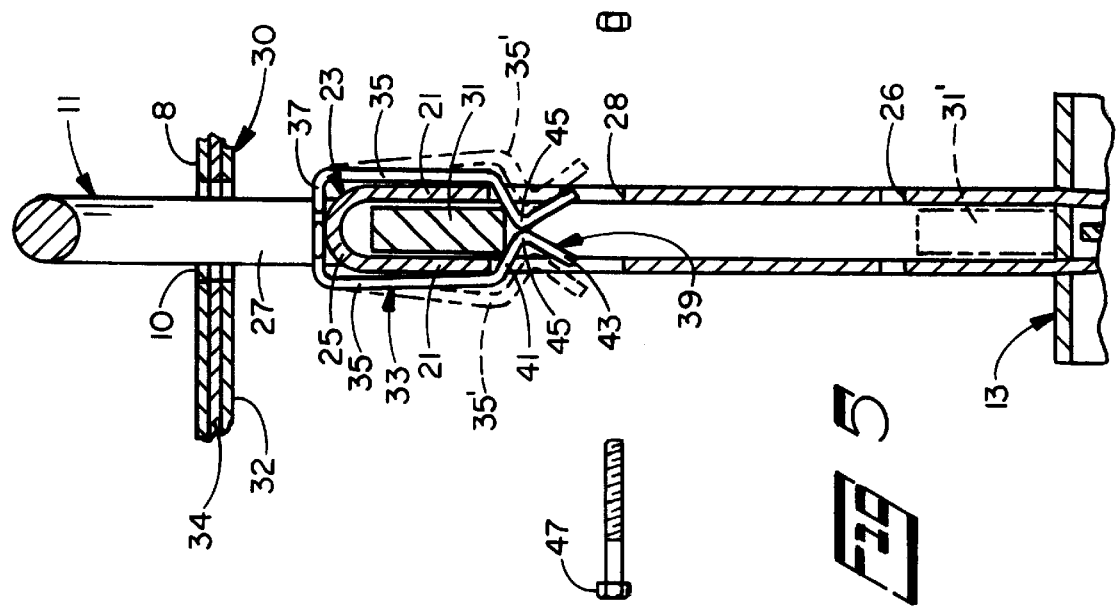
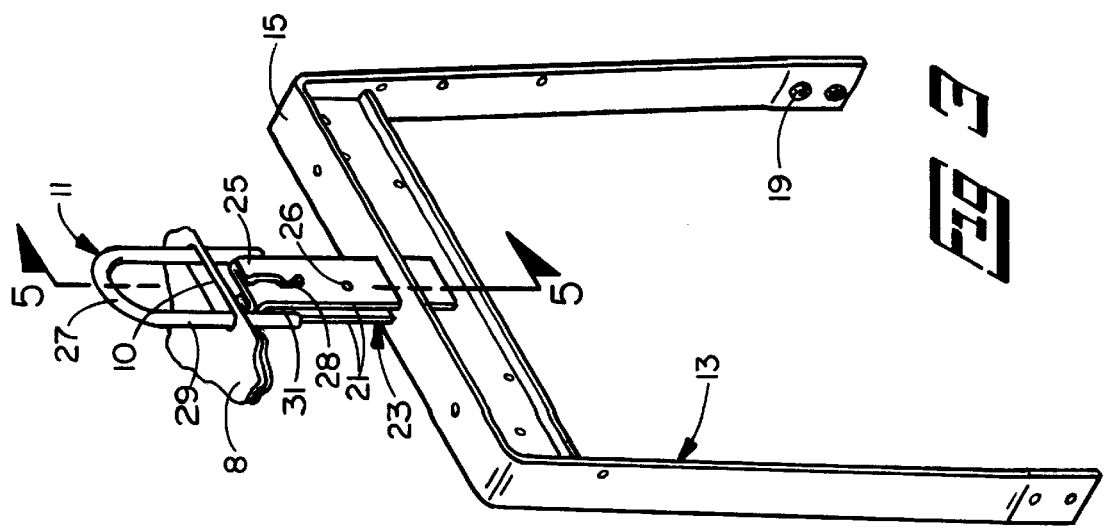

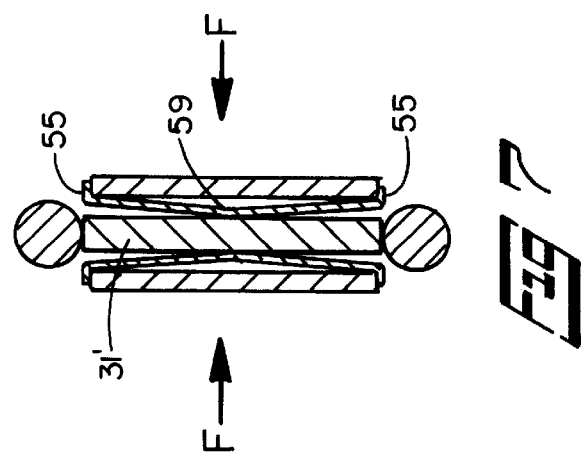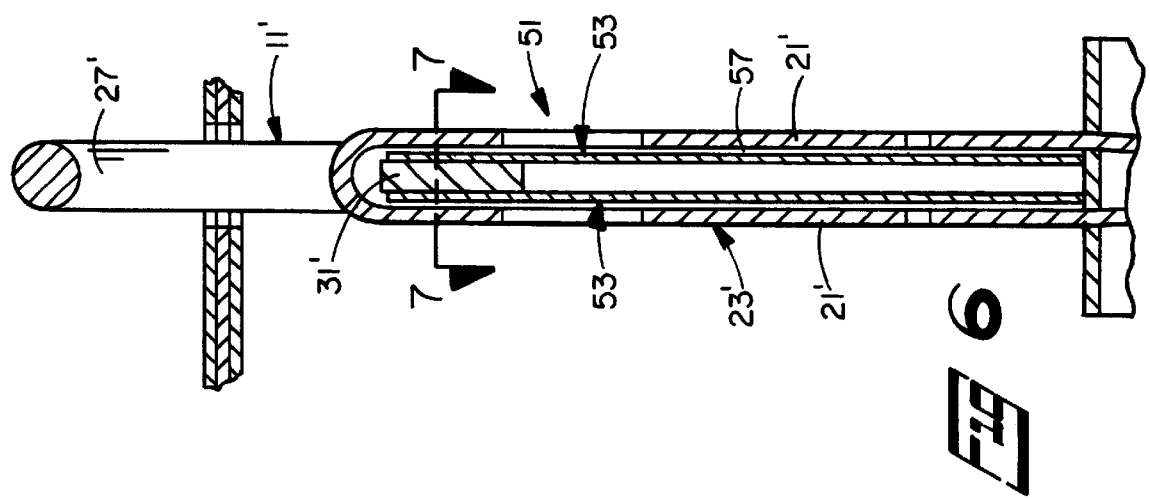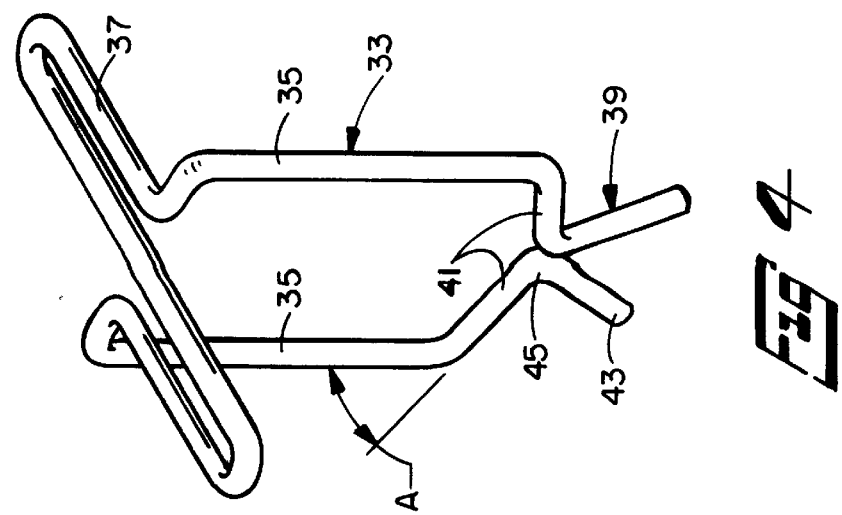

MOVEABLE LIFTING EYE MECHANISM

BACKGROUND OF THE INVENTION

1. Field of the Invention

This invention pertains to handling heavy equipment, and more particularly to apparatus for lifting welding machines.

2. Description of the Prior Art

Engine-driven welding machines are large and heavy, and therefore care must be used when handling them. To facilitate moving them, enginedriven welding machines often include a lifting eye that is rigidly fixed to the machine frame. The lifting eye is located such that the welding machine is balanced when lifted by a crane hook or the like. To be useful, the lifting eye must be readily accessible. Normally, that requires that it be outside and above the welding machine top cover.

The presence of a lifting eye on the top of a welding machine has some disadvantages. For example, the lifting eye adds to the overall height of the welding machine. Consequently, larger containers are required for shipping a given number of the machines. In addition, the lifting eye prevents stacking the welding machines one on top of another.

To alleviate the problems associated with fixed lifting eyes, it is known to use moveable components. A commercially available welding machine has a lifting plate that is slidable between raised and lowered positions. One end of the plate has a rather small opening through it. When the lifting plate is in the lowered position, the plate and hole are completely within the machine. The plate can be pulled upwardly to expose the opening for lifting purposes. To retain the plate in the raised position, two screws must be inserted through the plate and an adjoining machine structural member. Conversely, when it is desired to lower the lifting plate, the screws must first be removed. The small size of the lifting plate opening and the requirement of installing and removing screws every time the plate is moved are important drawbacks of the prior lifting plate design.

SUMMARY OF THE INVENTION

In accordance with the present invention, a moveable lifting eye mechanism is provided that is both very robust and easy to use. This is accomplished by apparatus that includes a lifting eye that is guided by a strap.

The lifting eye is comprised of a bail and a bar that connects the stems of the bail. The strap has straight portions with respective free ends that are rigidly secured to a structural member of an object to be lifted. The strap straight portions are spaced apart a distance that guides and allows the bar of the lifting eye to slide easily between them. The strap straight portions are joined at respective second ends by a connector. According to one aspect of the invention, the strap straight portions and connector are integral in the form of a U-shaped strap.

The lifting eye is slidable between a retracted position and an extended position. When the lifting eye is in the retracted position, the bail is mostly below a selected surface of the object, such as a top cover of a welding machine. However, part of the bail remains above the object surface such that there is a small opening between the bail and the object surface. The lifting eye is then out of the way for shipping and storage purposes, but there is sufficient access to the bail for lifting it with a finger. The lifting eye is located against a positive stop when it is in the retracted position.

When the lifting eye is in the extended position, the lifting eye bar is located against the strap connector. In that situation, practically the entire bail is above the selected object surface, such as the welding machine top cover. The lifting eye is then completely accessible for lifting purposes.

Further in accordance with the present invention, the lifting eye is retained in the extended position by a spring that engages the strap. The spring has two legs that are connected by a center section. In use, the spring center section overlies the strap connector. The legs of the spring have respective free ends that terminate in inwardly facing V-sections. The spring V-sections protrude through respective slots in the strap straight portions and lie in the path of the lifting eye bar when it slides between the extended and retracted positions. Inner arms of the spring V-sections support the lifting eye bar when it is in the extended position. Pushing the lifting eye against the inner arms of the spring V-sections resiliently deflects the spring legs apart and enables the lifting eye bar to pass between the V-sections. When the lifting eye bar has passed the V-sections and the lifting eye is in the retracted position, the spring legs return to their undeflected condition.

Gravity maintains the lifting eye in the retracted position until it is intentionally pulled upward toward its extended position. When that occurs, the lifting eye bar contacts the V-section outer arms and deflects the spring legs apart until the bar passes them and is again in its extended position. Then the spring legs return to their undeflected condition. If desired, a bolt can be placed through the straight portions of the strap to positively retain the lifting eye in either its extended or retracted position.

According to another aspect of the invention, the lifting eye is retained in the extended position by a friction force. In one embodiment, a pair of resilient plates are captured in the strap. The plates are generally V-shaped, and their respective apexes are in contact with opposite sides of the lifting eye bar. A friction force is created between the plates and the lifting eye bar in response to a tendency of the lifting eye to slide within the strap.

Other advantages, benefits, and features of the present invention will become apparent to those skilled in the art upon reading the detailed description of the invention.

BRIEF DESCRIPTION OF THE DRAWINGS

FIG. 3 is a perspective view on an enlarged scale of the moveable lifting eye mechanism of the invention.

FIG. 4 is a perspective view of the spring that is part of the moveable lifting eye mechanism of the invention.

FIG. 5 is a cross sectional view on an enlarged scale taken along line 5—5 of FIG. 3.

FIG. 6 is a view generally similar to FIG. 5, but. showing a modified embodiment of the invention.

FIG. 7 is a cross sectional view taken along line 7—7 of FIG. 6.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
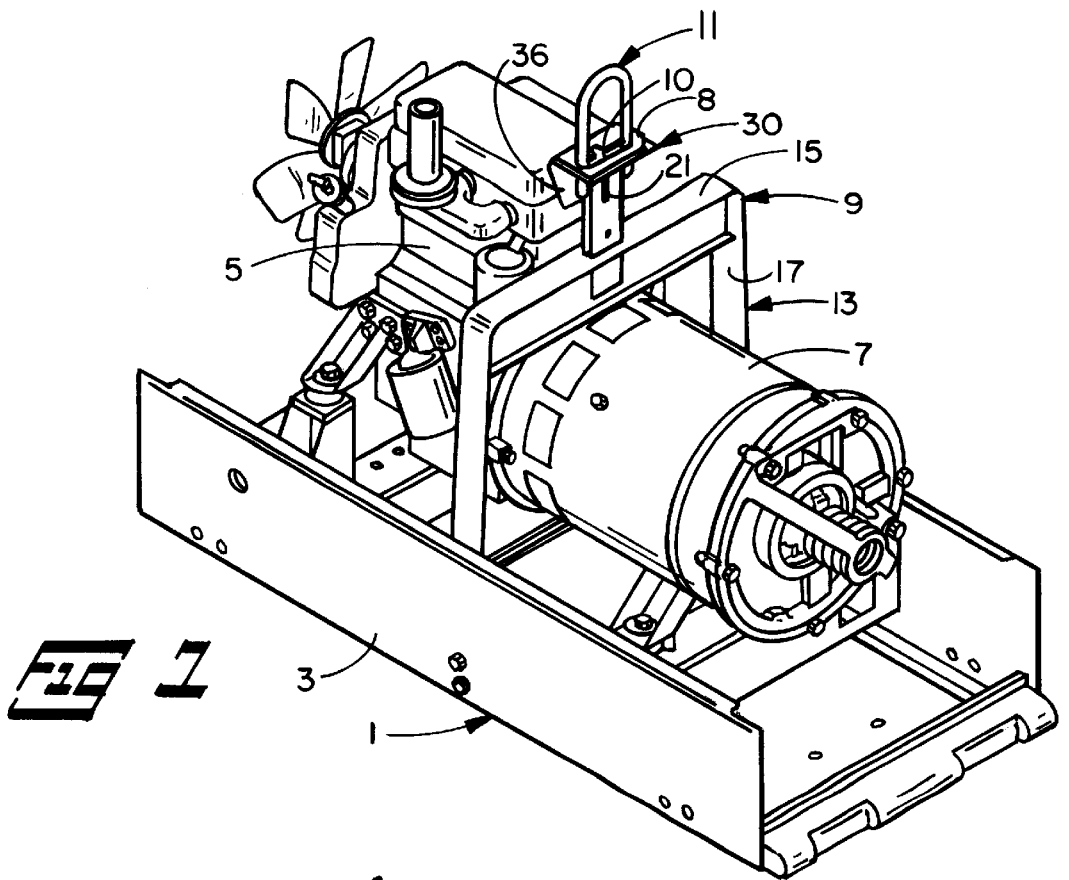
FIG. 1 is a perspective view of an engine-driven welding machine that includes the movable lifting eye mechanism of the invention, which is shown in the extended position.
Figure 2:
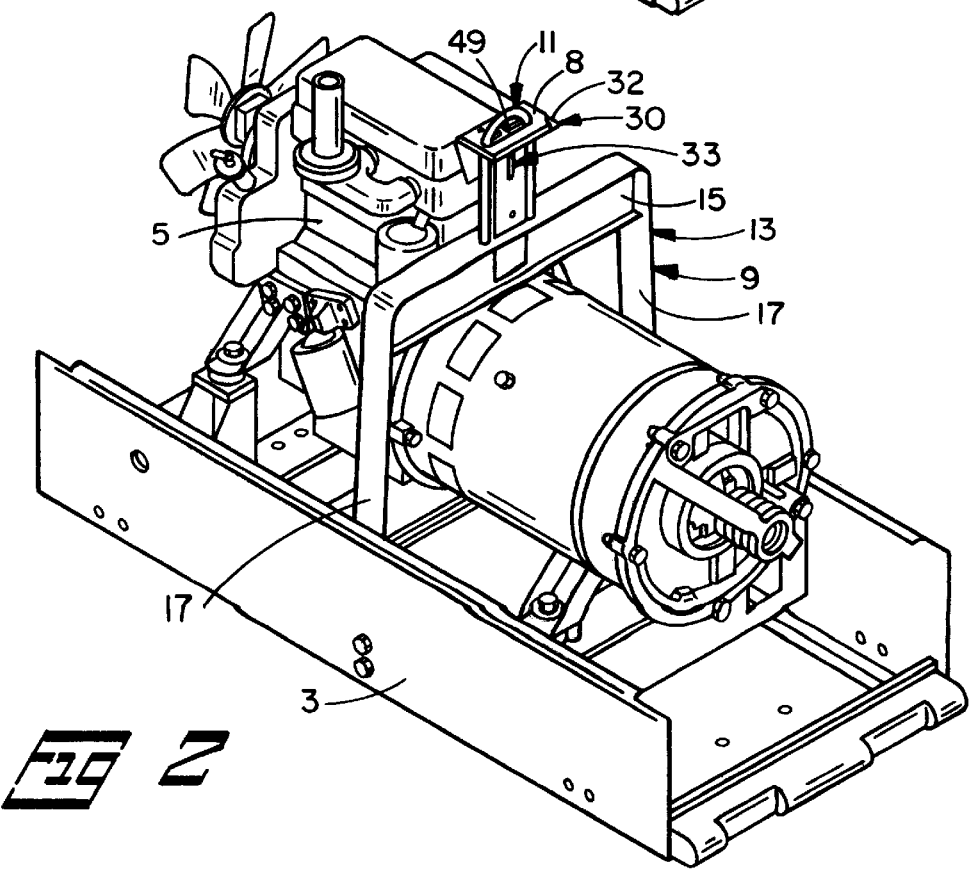
FIG. 2 is a view similar to FIG. 1, but showing the moveable lifting eye mechanism in the retracted position.

Referring first to FIGS. 1–3, a typical engine-driven welding machine 1 is illustrated that includes the present invention. The welding machine 1 includes a base 3 that supports an internal combustion engine 5. The engine 5 rotates an electric generator 7 that is also supported on the base 3. The generator 7 supplies electrical power to welding related components, not shown but well known to persons skilled in the art, housed in the base. The welding machine is enclosed to a considerable extent by sheet metal covers fastened to the base. The covers include a horizontal top cover 8.

In accordance with the present invention, a moveable lifting eye mechanism 9 is incorporated into the welding machine 1. The moveable lifting eye mechanism 9 enables the welding machine to be lifted from above by a crane or similar equipment. The moveable lifting eye mechanism includes a lifting eye 11 that is slidable between an extended position as shown in FIGS. 1 and 3, and a retracted position as shown in FIG. 2. When the lifting eye 11 is in the extended position, most of it is exposed above the machine top cover 8. When the lifting eye is in the retracted position, it is almost entirely below the machine top cover. An elongated cutout 10 in the top cover enables the lifting eye to slide to its retracted position.

In the illustrated construction, the moveable lifting eye mechanism 9 is comprised of a sturdy yoke 13 having a horizontal cross-piece 15 and two vertical side bands 17. The free ends of the yoke side bands 17 are firmly joined to the machine base 3, as by fasteners 19. Secured to the yoke cross-piece 15 are the ends of straight portions 21 of a strap 23. In the preferred embodiment, the strap 23 is U-shaped, in which the straight portions 21 are connected by an integral bight 25. There are aligned holes 26 through the strap straight portions. There also are aligned slots 28 through the strap straight portions between the holes 26 and the bight 25.

An angled support 30 has a horizontal panel 32 that lies under the welding machine top cover. Preferably, a rubber pad 34 is sandwiched between the machine top cover and the horizontal panel 32 of the support 30. Also see FIG. 5. The support horizontal panel and the rubber pad 34 have respective cutouts that are aligned with the cutout 10 in the machine top cover. A second panel 36 of the support 30 is attached to one of the straight portions 21 of the strap 23.

The lifting eye 11 is composed of a bail 27 having a large radius and widely spaced stems 29. A bar 31 connects the bail stems 29. The lifting eye bar 31 is slidable between the straight portions 21 of the U-shaped strap 23. As shown in FIGS. 1 and 3, the lifting eye is in the extended position. In that position, the lifting eye bar is against the bight 25 of the strap. Accordingly, a lifting force on the lifting eye bail 27 is transmitted through the bar 31 to the strap and then to the yoke. 13. The large size of the bail greatly facilitates inserting a crane hook or other lifting device through it.

It is a feature of the present invention that the lifting eye 11 is retained in its extended position by a spring 33. Looking at FIGS. 4 and 5, the spring 33 has two straight and parallel legs 35. One end of each leg 35 is connected to a center section 37. An elongated S-shape works very well for the spring center section 37. The plane of the spring center section is perpendicular to the legs 35. The free ends of the legs terminate in respective inwardly facing V-sections 39. Each V-section 39 has an inner arm 41 that makes an acute angle A with the associated straight leg. An outer arm 43 connects to the inner arm 41 at a junction 45. I prefer that the angle A be approximately 60 degrees, and also that the outer arm 43 intersect the inner arm at approximately 90 degrees.

The spring 33 is used by placing the center section 37 on the bight 25 of the U-shaped strap 23. The spring legs 35 straddle the straight portions 21 of the strap. The V-sections 39-protrude through the strap slots 28 such that the junctions 45 lie in the path of the lifting eye bar 31.

In FIG. 5, the lifting eye 11 is shown in the extended position. In that situation, the bar 31 is close to the bight 25 of the U-shaped strap 23 and rests on the inner arms 41 of the spring 33. The support 30 aids in keeping the lifting eye in a generally upright attitude. The steep angle of the spring arms 41 relative to the legs 35 easily supports the lifting eye in the extended position against gravity. If desired, a fastener, such as a bolt and nut 47, can be inserted through the strap slots 28 to positively retain the lifting eye in the extended position.

To retract the lifting eye 11, it is pushed against the inner arms 41 of the spring 33. The force of the bar 31 on the arms 41 causes the spring legs 35 to deflect away from each other to the condition shown at reference numeral 35'. The lifting eye bar can then slide between the junctions 45 of the spring V-sections 39 to the retracted position shown at reference numeral 31'. The spring legs return to their undeflected condition 35 after the bar has passed the V-section junctions. The lifting eye is maintained in its retracted position by gravity.

In the retracted position, the bar 31' is in contact with the yoke 13 (FIG. 5), and the bail 27 is recessed almost entirely below the welding machine top cover 8. However, as best shown in FIG. 2, there is a small opening 49 between the. bail and the top cover. The opening 49 is large enough to insert a person's finger. In that manner, the lifting eye is accessible to manually pull it upwardly from its retracted position toward the extended position. The shallow angle of the spring outer arms 43 relative to the spring legs 35 provide but little resistance to sliding the bar 31 upwardly and deflecting the spring legs, as shown at reference numeral 35' (FIG. 5), when the lifting eye is returned toward its extended position. A bolt 47 can be inserted through the holes 26 if it is desired to positively hold the lifting eye 11 in the retracted position.

In a modified embodiment of the invention, the lifting eye is retained in its extended position by a friction force. Turning to FIGS. 6 and 7, a lifting eye mechanism 51 comprises a lifting eye 11' and a strap 23'. The lifting eye 11' has a bail 27' and a bar 31'. The strap 23' has straight portions 21'. In the particular construction illustrated, the friction force is produced by a pair of resilient plates 53. The plates 53 are preferably approximately as long as the strap straight portion 21'. Each plate 53 is fabricated in a shallow V-shape. The free edges of each plate are bent over to form respective tabs 55. A plate is inserted into the space 57 between the lifting eye bar 31' and the associated strap straight portion 21' with the plate apex 59 in contact with the lifting eye bar 31'. The plates are fabricated such that they must be deformed to a more shallow shape in order to fit between the strap 23' and the lifting eye bar 31'. Consequently, restoring forces are created within the plates that produce lateral forces F on the bar 31'. The lateral forces F introduce friction between the plates and the bar 31' in response to a tendency of the lifting eye to slide in the strap. The lateral forces produce sufficient friction on the lifting eye to retain it in the extended position against gravity. The plate tabs 55 prevent the plates from working loose from the strap 23'.

Thus, it is apparent that there has been provided, in accordance with the invention, a moveable lifting eye mechanism that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. In a welding machine having a base, means supported by the base for producing welding power, and a top cover over the means for producing the welding power, a moveable lifting eye mechanism comprising:
   a. a yoke fastened to the base;
   b. a U-shaped strap having two straight portions of generally equal length, the straight portions being secured to the yoke, and a bight; and
   c. a lifting eye selectively slidable between and contactable with both the strap straight portions along a path to a selected one of an extended position whereat the lifting eye is completely accessible above the welding machine top cover for lifting the welding machine, and a retracted position whereat the lifting eye is recessed almost entirely below the welding machine top cover whereat the lifting eye is accessible only by a finger opening between the top cover and the lifting eye.

2. The welding machine of claim 1 wherein:
   a. the lifting eye comprises a semi-circular bail having a pair of stems, and a bar connected to the bail stems;
   b. the lifting eye bar slides between and is contactable with both of the straight portions of the U-shaped strap; and
   c. the bail and the welding machine top cover cooperate to define the finger opening when the lifting eye is in the retracted position,
   so that the lifting eye can be manually pulled from the retracted position thereof toward the extended position.

3. The welding machine of claim 2 wherein the lifting eye bar is adjacent the bight of the U-shaped strap when the lifting eye is in the extended position, and wherein the lifting eye bar contacts the yoke when the lifting eye is in the retracted position.

4. The welding machine of claim 2 further comprising a spring that cooperates with the lifting eye bar to retain the lifting eye in the extended position.

5. The welding machine of claim 2 further comprising plate means for introducing a friction force on the lifting eye that retains the lifting eye in the extended position thereof.

6. The welding machine of claim 5 wherein the plate means comprises at least one plate interposed between and co-acting with a straight portion of the strap and the lifting eye bar to produce a friction force on the lifting eye bar that resists sliding of the lifting eye between the strap straight portions.

7. The welding machine of claim 1 further comprising spring means for retaining the lifting eye in the extended position.

8. The welding machine of claim 1 further comprising friction means for retaining the lifting eye in the extended position by a friction force.

9. In a welding machine having a base, means supported by the base for producing welding power, and a top cover over the means for producing welding power, a moveable lifting eye mechanism comprising:
   a. a yoke fastened to the base;
   b. a U-shaped strap having straight portions secured to the yoke, and a bight, wherein the straight portions of the U-shaped strap have respective slots therethrough;
   c. a lifting eye selectively slideable between the strap straight portions along a path to a selected one of an extended position whereat the lifting eye is completely accessible above the welding machine top cover for lifting the welding machine, and a retracted position whereat the lifting eye is recessed almost entirely below the welding machine top cover, wherein:
      i. the lifting eye comprises a bail having a pair of stems, and a bar connected to the bail stems; and
      ii. the lifting eye bar slides between the straight portions of the U-shaped strap; and
   d. a spring that cooperates with the lifting eye bar to retain the lifting eye in the extended position, wherein the spring comprises parallel legs joined at a center section, the spring legs having respective inwardly facing V-sections that protrude through associated slots in the strap straight portions, the V-sections lying in the path of the lifting eye bar when the lifting eye slides between the extended and retracted positions.

10. The welding machine of claim 9 wherein the V-sections of the spring have respective inner arms that support the lifting eye bar when the lifting eye is in the extended position thereof.

* * * * *